United States Patent [19]

Tengan

[11] Patent Number: 5,386,513
[45] Date of Patent: Jan. 31, 1995

[54] SELF FILLING AND EMPTYING DATA PIPELINE

[75] Inventor: Curtis S. Tengan, Buena Park, Calif.

[73] Assignee: Rockwell International Corporation, Seal Beach, Calif.

[21] Appl. No.: 756,686

[22] Filed: Sep. 9, 1991

[51] Int. Cl.6 .................................................. G06F 3/00
[52] U.S. Cl. ...................................... 395/250; 395/550
[58] Field of Search ...................... 395/250, 800, 550

[56] References Cited

U.S. PATENT DOCUMENTS 4,930,102  5/1990  Jennings ............................ 395/350
5,084,837  1/1992  Matsumoto et al. ............... 395/250
5,093,809  3/1992  Schmitt-Landsiedel et al. ... 395/800

Primary Examiner—Tod R. Swann
Attorney, Agent, or Firm—H. F. Hamann; G. A. Montanye; Tom Streeter

[57] ABSTRACT

The SELF FILLING AND EMPTYING DATA PIPE LINE disclosed herein fills a pipeline register automatically when it is empty, without requiring a double request from the receiver. When the pipeline register is full, it is maintained in a full condition for as long as the sender has valid data. When the sender no longer has valid data, the pipeline empties itself of all remaining valid data to the receiver.

8 Claims, 11 Drawing Sheets

CASE 1: DATA PIPELINE IS EMPTY

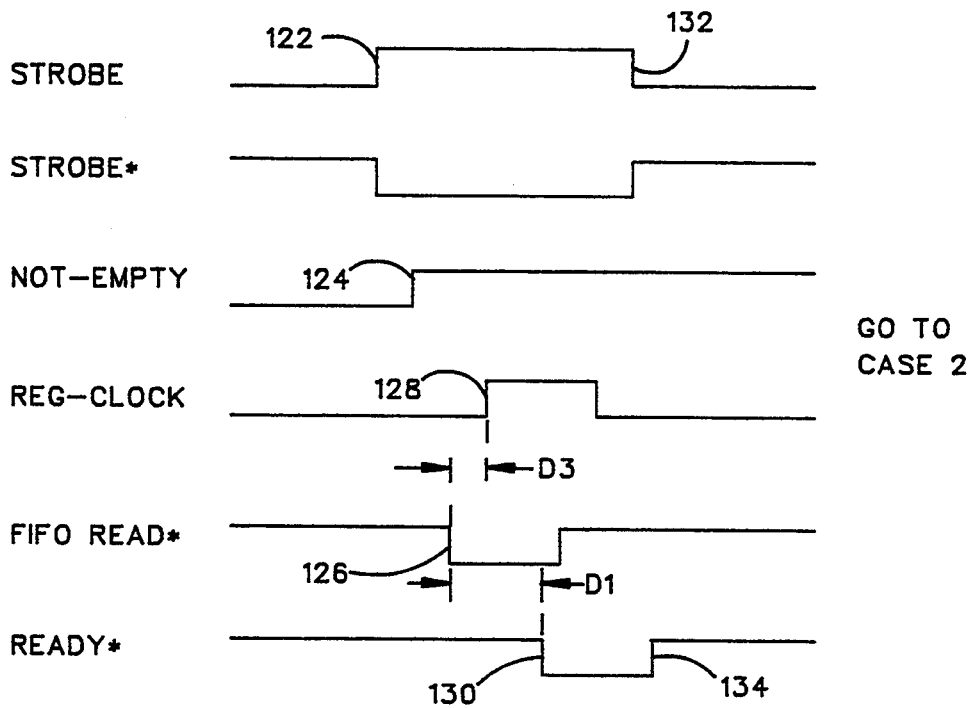

122) STROBE GOES HIGH, INDICATING START OF TRANSFER REQUEST.

124) NOT-EMPTY GOES HIGH, INDICATING THAT VALID DATA IS AVAILABLE IN THE FIFO.

126) FIFO-READ* IS INITIATED.

128) AFTER D3 DELAY, GENERATE REG-CLOCK TO MOVE DATA FROM FIFO TO PIPELINE REGISTER.

130) AFTER D1 DELAY, GENERATE READY* SIGNAL.

132) STROBE SIGNAL GOES LOW, INDICATING END OF DATA TRANSFER.

134) READY* SIGNAL IS CLEARED.

FIG. 9

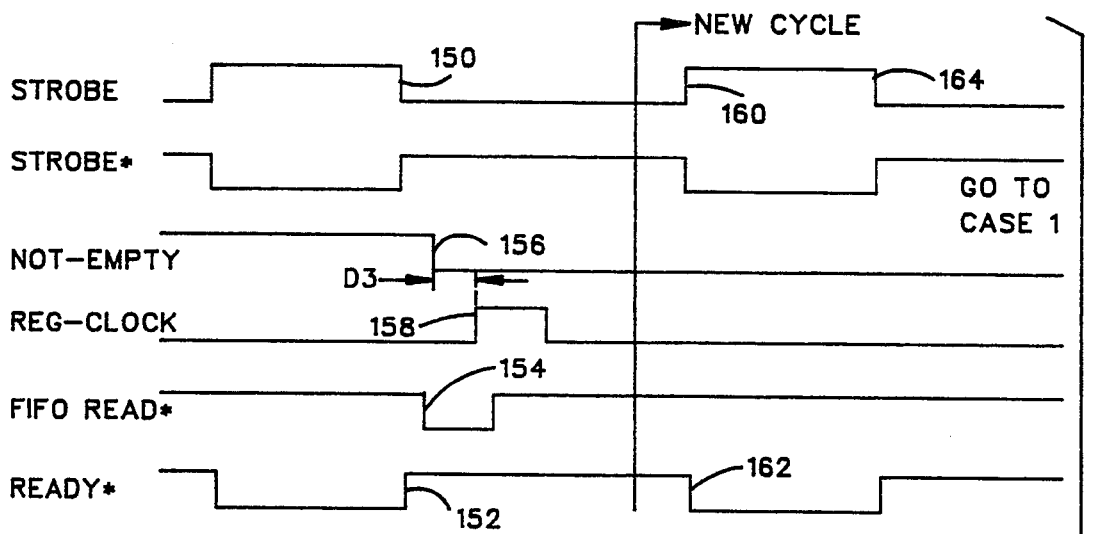

CASE 3: DATA PIPELINE GOES EMPTY

150) STROBE GOES LOW, INDICATING END OF DATA TRANSFER CYCLE.

152) READY* SIGNAL IS CLEARED.

154) FIFO-READ* IS INITIATED.

156) NOT-EMPTY SIGNAL GOES LOW, INDICATING NO VALID DATA IN FIFO.

158) AFTER D3 DELAY, GENERATE REG-CLOCK TO MOVE DATA FROM FIFO TO PIPELINE REGISTER.

160) STROBE GOES HIGH, INDICATING START OF NEXT DATA TRANSFER CYCLE.

162) READY SIGNAL IS ACTIVATED, EVEN THOUGH NO READ OUT OF FIFO TAKES PLACE; THIS IS THE PIPELINE EMPTYING ACTION.

164) DATA TRANSFER CYCLE IS COMPLETED.

FIG. 11

SELF FILLING AND EMPTYING DATA PIPELINE

This invention was made with Government support under Contract No. F08635-89-C-0083 awarded by the Air Force. The Government has certain rights in this invention.

BACKGROUND OF THE INVENTION

This invention relates to apparatus for transferring data from one electronic device to another, and has particular relation to such apparatus when the devices are asynchonous and remote from each other.

When two devices are operating at different speeds, it makes no sense for the device which is sending data (sender) to delay in sending the data until the device which is receiving the data (receiver) is ready to receive it. Instead, the data is placed in a buffer by the sender, which works on a first-in-first-out (FIFO) basis. The receiver then requests and gets the oldest piece of data from the FIFO, rather than communicating directly with the sender. This allows additional pieces of data to be placed in the FIFO by the sender.

As long as the average operation speed of the sender is about the same as that of the receiver, both devices may operate at top speed. When the sender produces a sudden spurt of data, it may output it to the FIFO, making it fuller, without waiting for the receiver to accept the data. Likewise, when the sender is occupied obtaining the next piece of data, the receiver may consume the data in the FIFO, making it emptier, and need not delay this data consumption until the sender has sent the data. Only if the FIFO is empty does the receiver have to wait until the sender puts the next piece of data into the FIFO. A READY signal is used to communicate to the receiver when valid data is available.

The buffer (FIFO) could have significant access time delays in relation to the receiver data transfer cycle.

Since in this case the data transfer time includes the FIFO access time (i.e., the time it takes the receiver to read data out of the FIFO), a speed penalty of additional wait states for each data transfer may be incurred if the FIFO access time, plus the propagation delays, is longer than the minimum data transfer cycle time. This is not acceptable for high speed operations where additional wait states for every data transfer can not be tolerated.

The data transfer time can be speeded up by reading data out of the FIFO before the data transfer request and placing it in a pipeline register. This allows the receiver to get the data from the pipeline register immediately upon request without having to wait for the FIFO access time needed to read the data out.

While the pipeline register speeds up the typical data transfer cycle, three special cases need to be considered. The first case is when the pipeline is empty, i.e., the pipeline register does not have valid data. This happens when the system is first initialized or when the FIFO has been emptied and valid data has been read out of the pipeline register.

In this case the receiver will need to make two data transfers to get valid data. The first data transfer sends invalid data from the pipeline register to the receiver, while valid data is read out of the FIFO and is loaded into the pipeline register. On the second data transfer, this valid data is moved from pipeline register to the receiver. This double data transfer to get the first valid data is referred to as "filling the pipeline."

The prior art has no way to know when this double request should be made. It is possible to encode the invalid data so as to indicate to the receiver that the receiver should discard the invalid data and make another data transfer request. This requires that every piece of data be checked by the receiver for validity. Such checking is generally time consuming and often impossible for high speed operation.

The second case is the ordinary case. The pipeline register is full when it is read out to the receiver, and the FIFO has additional data to read into the pipeline register, i.e., the pipeline register remains full. The only special apparatus needed for this second case is whatever is required for a smooth transition to (or from) it and either the first or the third case.

The third case that the receiver or data transfer logic will need to check for is when the FIFO initially goes empty (is emptied of any valid data). In this case even though the FIFO has no valid words, there is still one remaining valid word in the pipeline register. The receiver or data transfer logic will need to allow one last transfer to occur from the pipeline register to the receiver even though no valid data is available in the FIFO. This last data transfer is referred to as "emptying the pipeline."

SUMMARY OF THE INVENTION

It is an objective of the present invention to provide an entirely hardware solution to the limitations of the prior art.

BRIEF DESCRIPTION OF THE DRAWINGS

FIG. 9 is a timing diagram, showing the operation of case 1.

FIG. 11 is a timing diagram showing the operation of case 3.

DETAILED DESCRIPTION OF THE DRAWINGS

Figure 1:
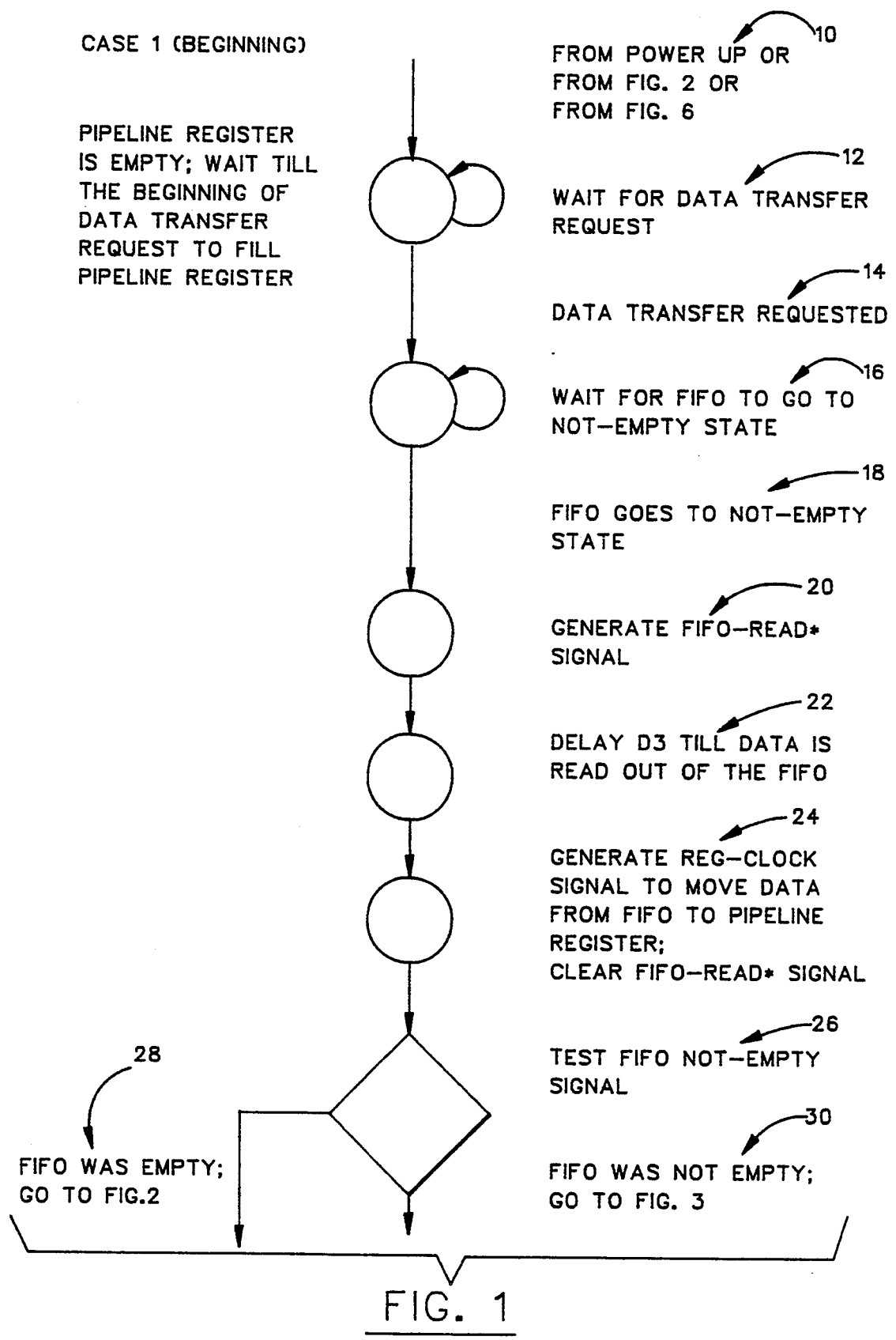
FIG. 1 is a state diagram showing the beginning portions of case 1.
Figure 2:
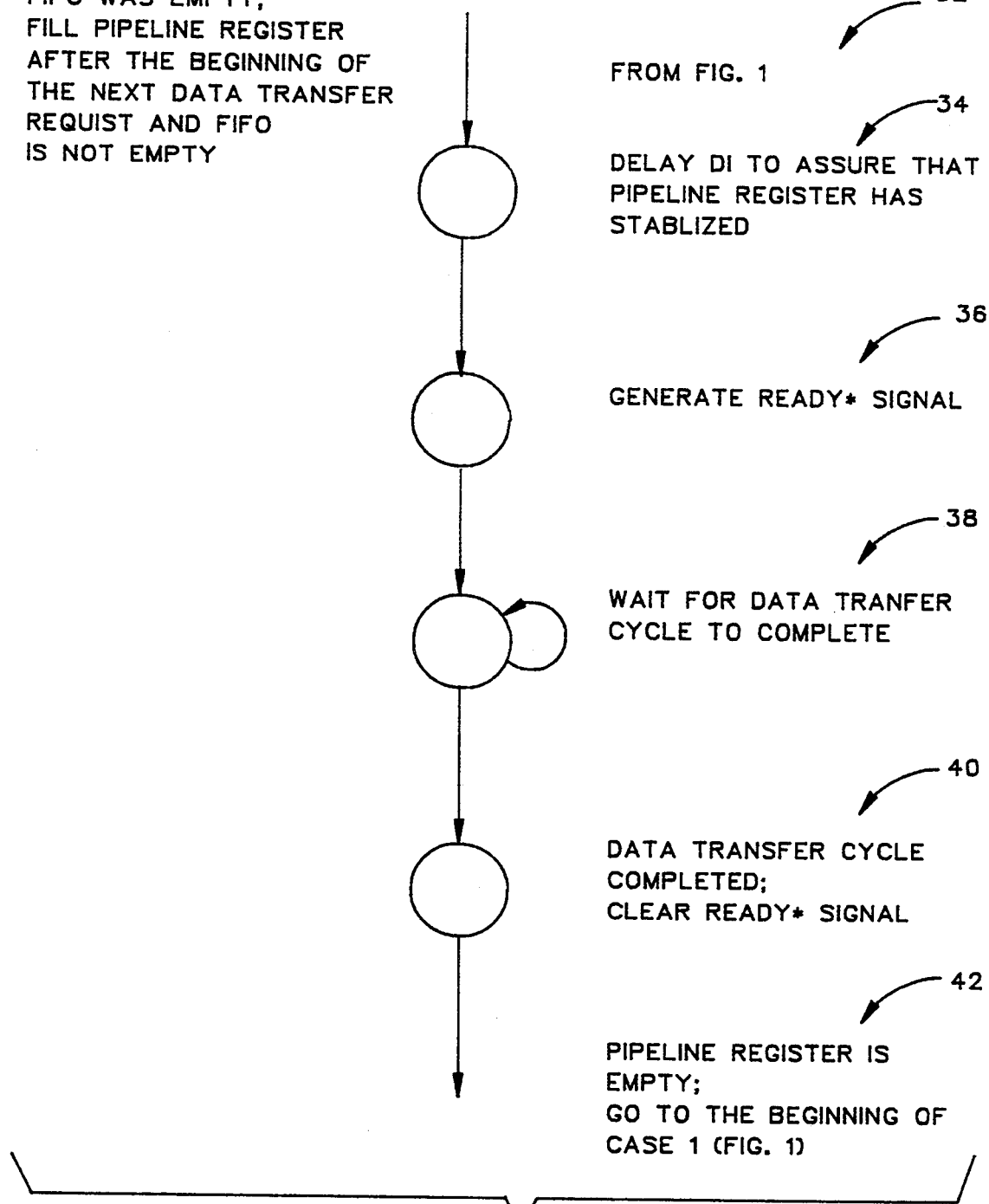
FIG. 2 is a state diagram showing a recursive ending to case 1, that is, only one valid piece of information is passed to the receiver, and a second double request must be made to get the next valid piece of information.
Figure 8:
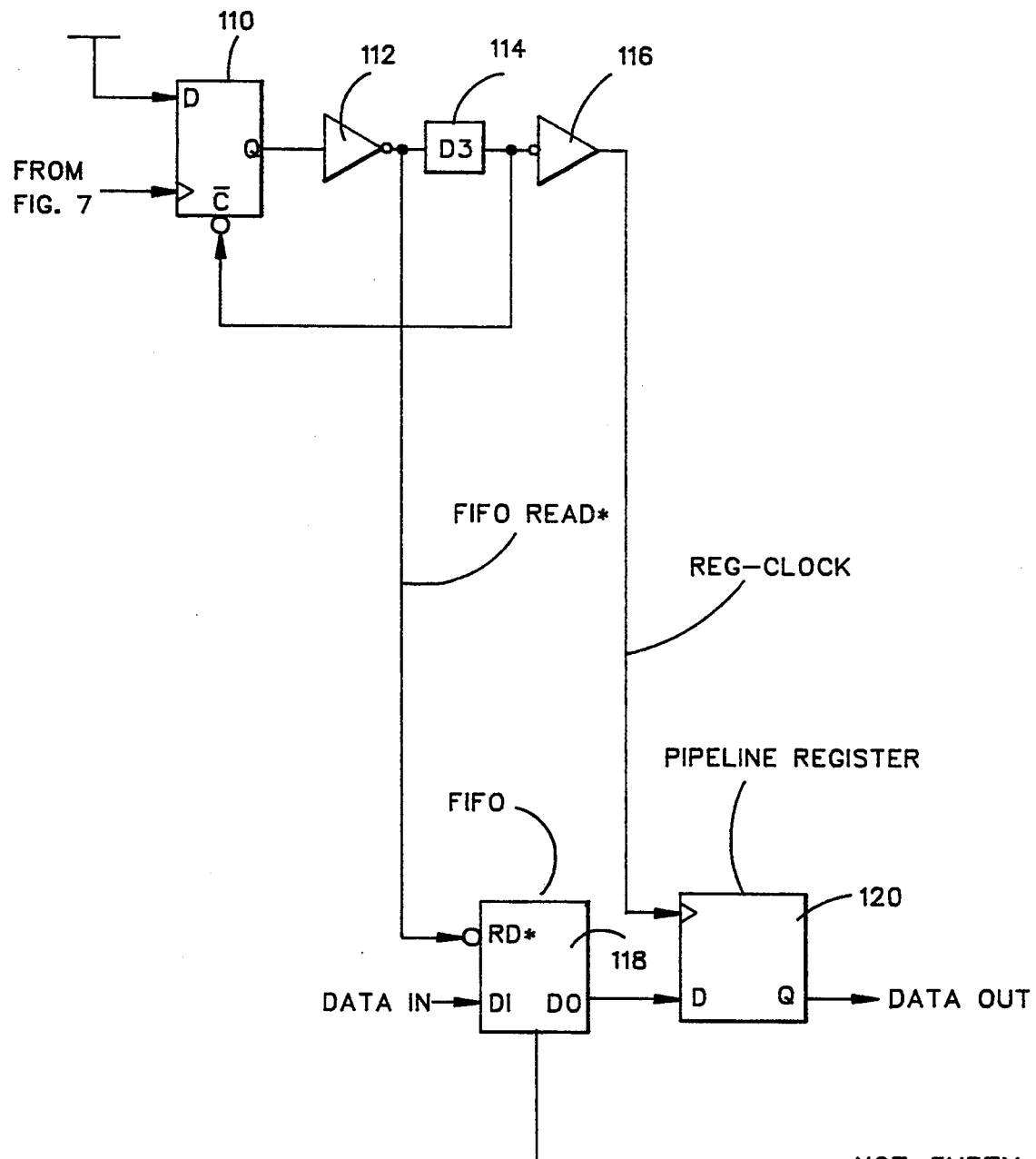
FIG. 8 is a schematic diagram of the back end of the apparatus of FIG. 7.

In FIG. 1, the beginning of case 1 is shown. The pipeline register is empty, and the apparatus is to wait until the beginning of the data transfer request to fill the pipeline register. This will occur at power up 10. It may also come about through feedback from the state diagrams shown in FIGS. 2 and 6. The apparatus waits for the data transfer request 12 and, eventually, the data transfer is requested 14. The apparatus then waits for the FIFO to go to a non-empty state 16 and, eventually, the FIFO does go to a non-empty state 18. Steps 12 and 14 can be reversed with steps 16 and 18 if desired. At this point, the apparatus generates a FIFO-READ* signal 20, and, as soon as the FIFO-READ* signal has been generated, the apparatus is to delay for a period D3, so as to allow the data to be read out of the FIFO 22. The duration of delay D3 depends on the operating characteristics of the FIFO 118 (FIG. 8). It should be long enough for the FIFO 118 to be read, but not so long as to unnecessarily delay operation of the apparatus as a whole. A FIFO-READ* signal is used rather than a FIFO-READ signal since it is convenient for the read input of the FIFO to include an inverter. The apparatus then generates a REG-CLOCK signal to move the data from the FIFO to the pipeline register; this action also clears the FIFO-READ* signal 24. The apparatus must then test the FIFO NOT-EMPTY signal 26 to determine its next activity. If the FIFO was empty 28, then the next activity is shown in FIG. 2. If the FIFO was not empty 30, then the next activity is shown in FIG. 3.

As noted above, FIG. 2 continues case 1 wherein the FIFO was empty. This is the recursive ending to case 1, and fills the pipeline register after the beginning of the next data transfer request, assuming that the FIFO is then not empty. Thus, picking up 32 from FIG. 1, the first activity is to delay for a period D1 to assure that the pipeline register has stabilized 34. The duration of delay D1 depends on the operating characteristics of the pipeline register 120 (FIG. 8). It should be long enough for the pipeline register 120 to stabilize, but not so long as to unnecessarily delay operation of the apparatus as a whole. The apparatus then generates a READY* signal 36, and waits 38 for the data transfer cycle to complete. When the data transfer cycle has been completed 40, the apparatus clears the READY* signal. The pipeline register is now empty 42, which is the situation to be handled by case 1. The apparatus therefore returns to the beginning of case 1, in FIG. 1.

Figure 3:
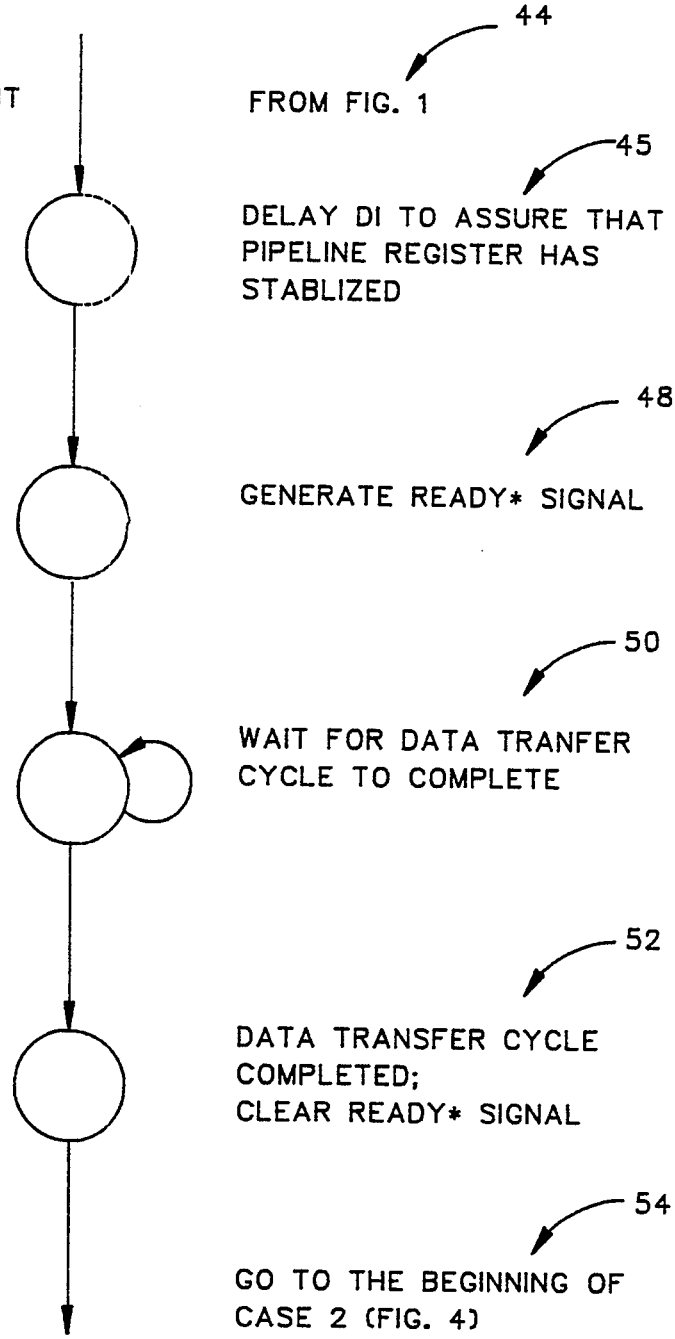
FIG. 3 is a state diagram showing the second half of case 1, with a transfer to case 2.

If, however, at the end of FIG. 1 the FIFO had not been empty, then the activities shown in FIG. 3 must take place. FIG. 3 shows the ending of case 1 in which a transfer to case 2 is to be made. In this situation, the FIFO is not empty, and the apparatus must fill the pipeline register at the end of the current data transfer request. This is in contrast to FIGS. 1 and 2, in which the pipeline register is to be filled at the beginning of the data transfer request. Thus, picking up 44 from FIG. 1, a delay D1 is imposed to assure that the pipeline register has stabilized 46. The READY* signal is generated 48, a wait cycle 50 for the data transfer cycle to complete is imposed, and, when this data transfer cycle is completed 52, a clear READY* signal is generated. This parallels the activities shown in FIG. 2, with the important difference that, since the FIFO was not empty, the pipeline register now is no longer empty either. Thus, instead of having to return to the beginning of case 1 (FIG. 2, step 42), the apparatus may proceed to the beginning of case 2 (FIG. 3, step 54).

Figure 4:
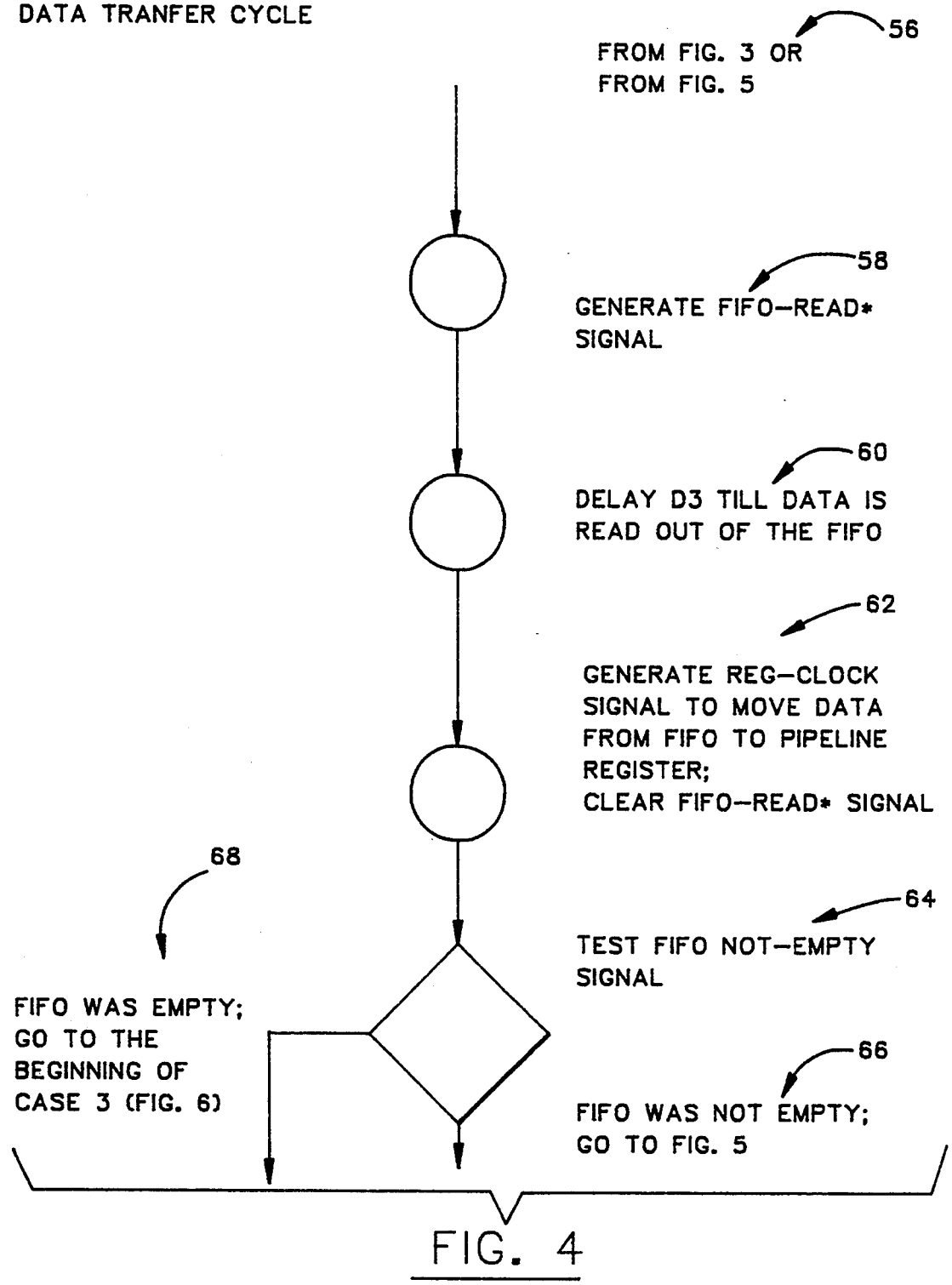
FIG. 4 is a state diagram showing the beginning of case 2, and providing a test for entry into case 3.

FIG. 4 shows the beginning of case 2, in which the pipeline register is to be filled at the end of the data transfer cycle. It is initiated 56 from the end of FIG. 3 or, as will be described below, the end of FIG. 5. A FIFO-READ* signal 58 is generated, after which a delay D3 is imposed until the data has been read out of the FIFO 60. This reading out is accomplished by generating a REG-CLOCK signal 62 to move data from the FIFO to the pipeline register; this REG-CLOCK signal must also clear the FIFO-READ* signal. It now becomes necessary to test 64 the FIFO NOT-EMPTY signal, as was done in step 26 of FIG. 1. If the FIFO was not empty, then the recursive ending to case 2 shown in FIG. 5 must be invoked 66. If the FIFO was empty, then case 3 must be invoked 68, as shown in FIG. 6.

Figure 5:
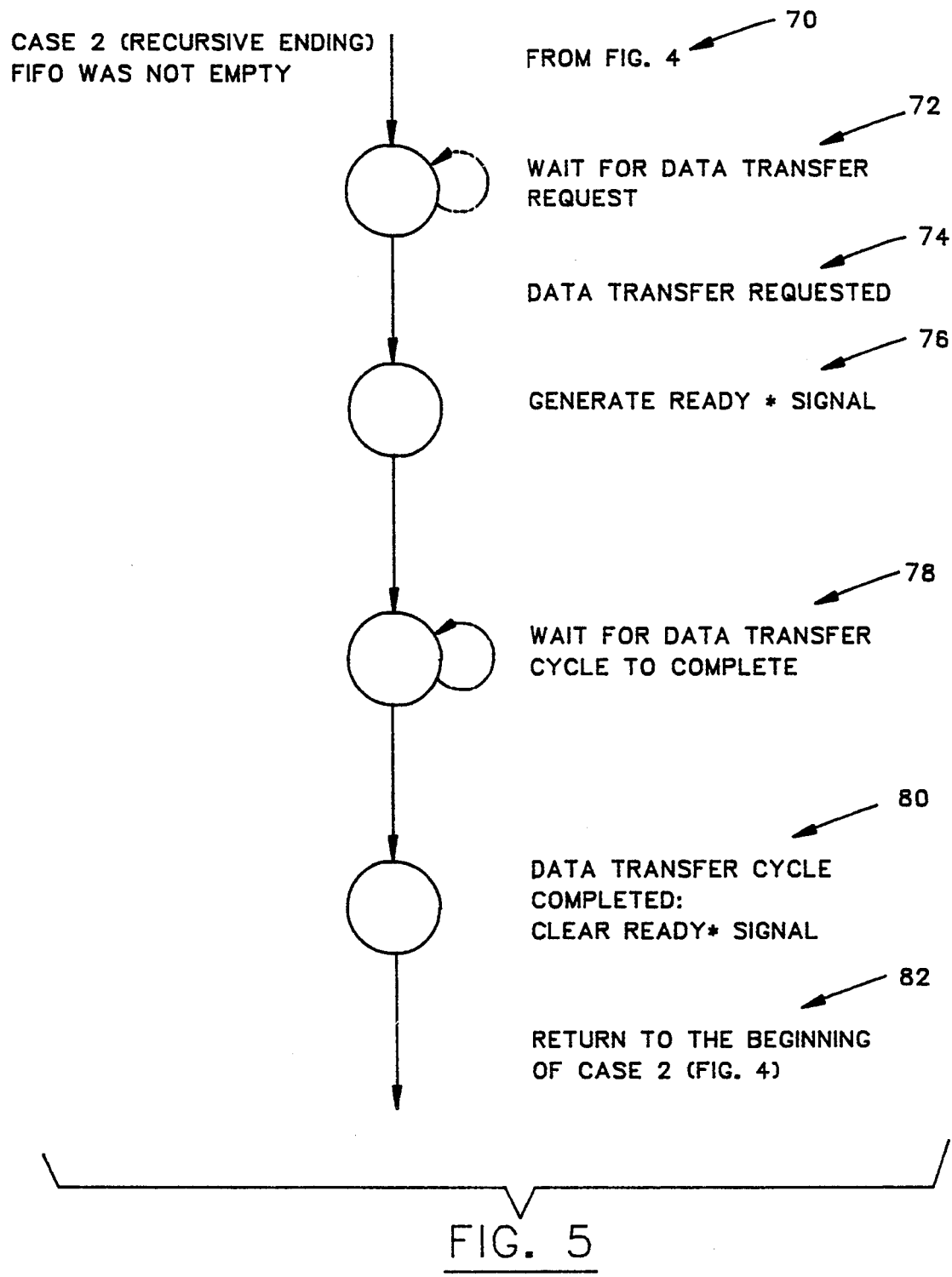
FIG. 5 is a state diagram showing a recursive ending for case 2, that is, the pipeline was full and remains full.

In FIG. 5, the recursive ending of case 2 is shown, in which the FIFO was not empty. FIG. 5 is entered 70 from FIG. 4 and begins by waiting for a data transfer request 72. The data transfer is eventually requested 74, at which time the apparatus generates the READY* signal 76. As in FIGS. 2 and 3, the READY* signal generation is followed by a wait for the data transfer cycle to complete 78, and, upon completion of the data transfer cycle 80, a clearing of the READY* signal. Since the FIFO was not empty at the beginning of the cycle, the pipeline register is not empty at the end of the cycle, and the beginning of case 2 can be reinvoked 82, starting at FIG. 4.

Figure 6:
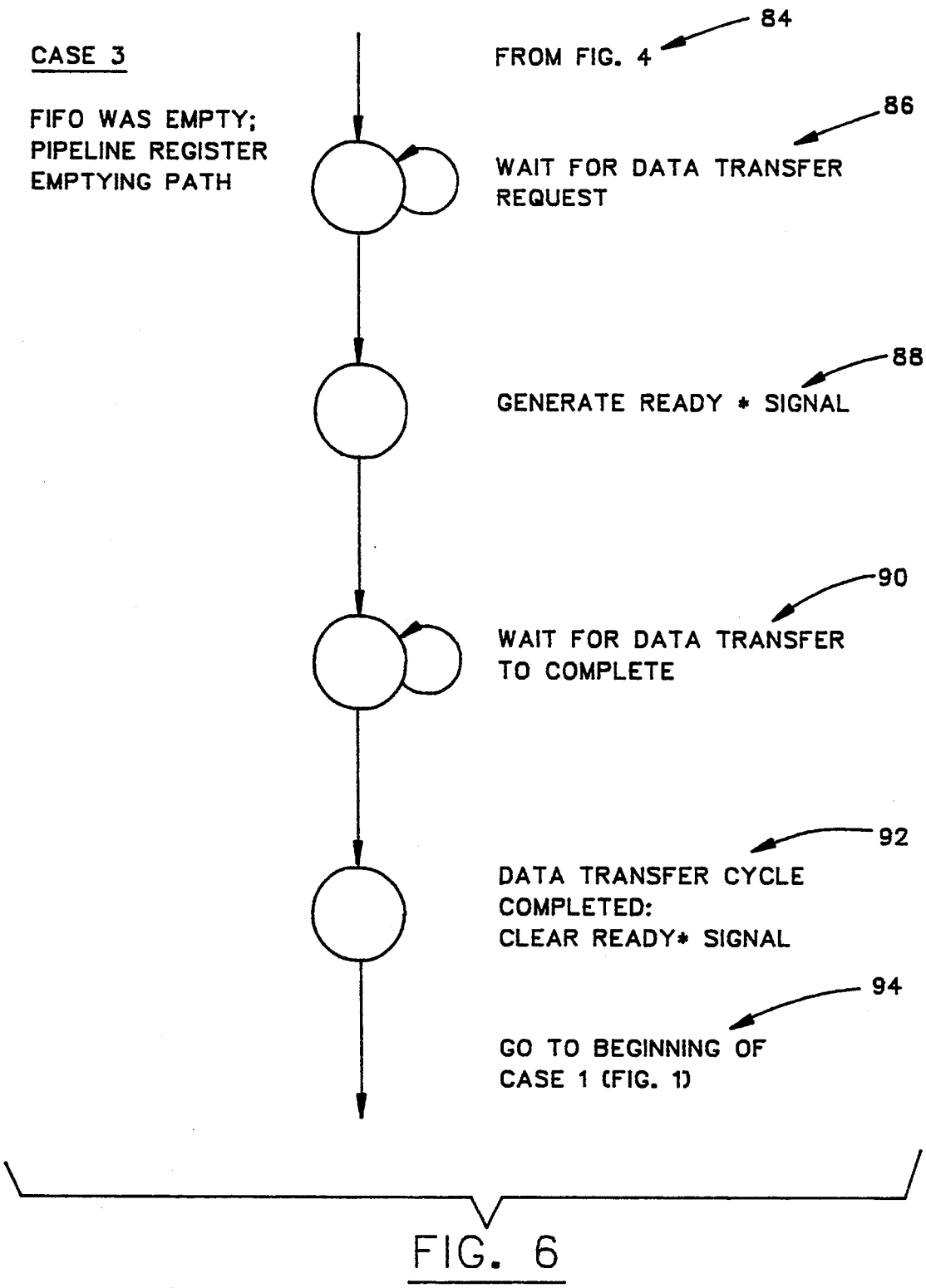
FIG. 6 is a state diagram for case 3, showing how all of the valid case 2 data may be emptied into the receiver, and how the system may reenter case 1.

FIG. 6 shows case 3, in which, although the pipeline register was full, the FIFO was empty. This is the pipeline register flushing path, in which the valid data in the pipeline register must be passed on, even though the FIFO is indicating that it is empty. Case 3 is invoked 84 from step 68 of FIG. 4. As in FIG. 5, the steps of a wait for a data transfer request 86, the generation of a READY* signal 88, the wait for the data transfer cycle to complete 90, and, upon completion of the data transfer cycle 92, the clearing of the READY* signal, follow, in that order. Since the FIFO was empty at the beginning of the cycle, however, the pipeline register is now empty at the end of the cycle, which means that case 1 must be invoked 94. The apparatus therefore returns to the start of FIG. 1.

Figure 7:
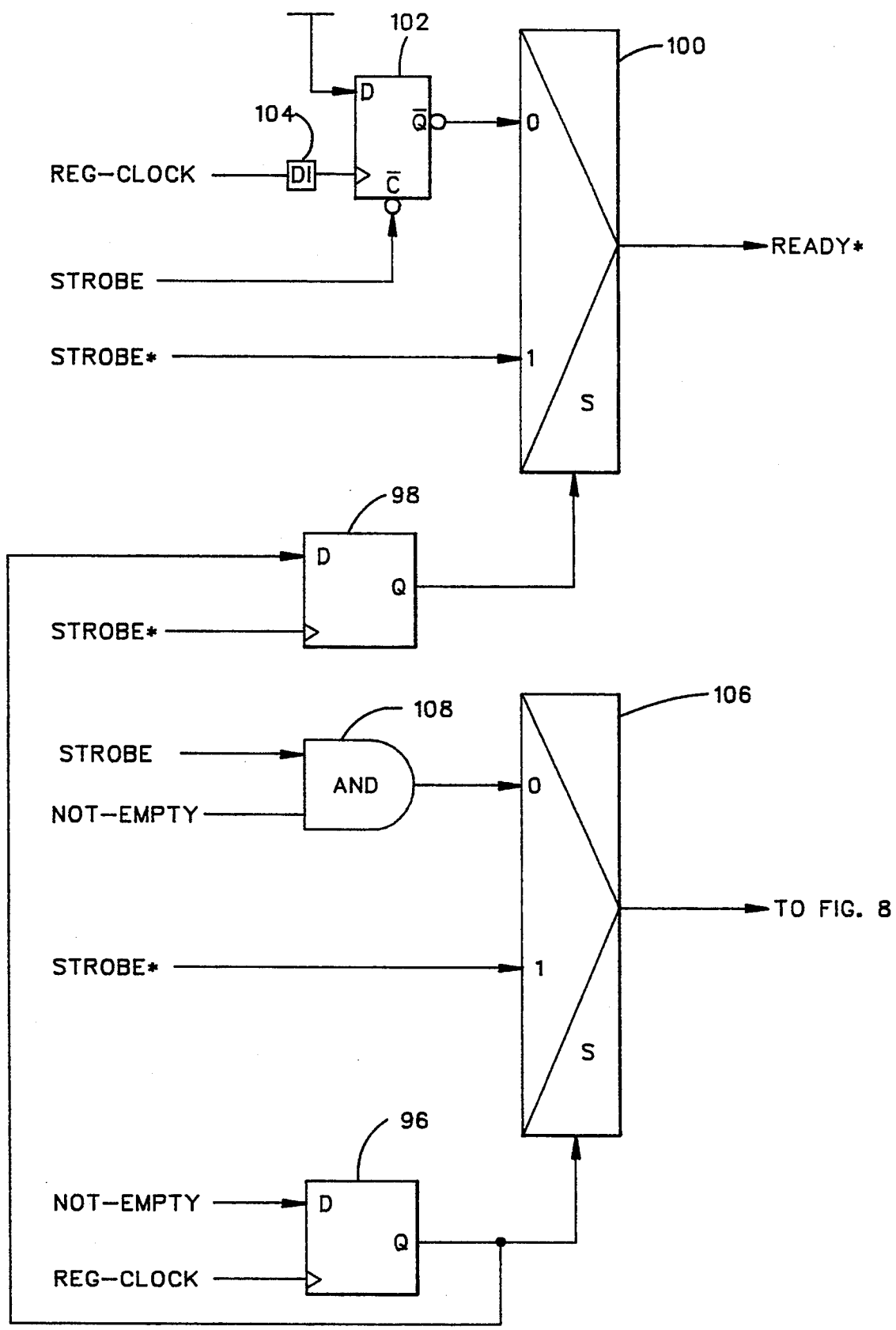
FIG. 7 is a schematic diagram of the front end of a particular apparatus for obtaining the state diagrams of FIGS. 1-6.

The foregoing state diagrams may be mechanized by the apparatus shown on FIGS. 7 and 8. In FIG. 7, a first register 96 receives a NOT-EMPTY signal from the FIFO (see FIG. 8) at its data input, and is clocked by a register clock signal REG-CLOCK, also generated as shown in FIG. 8. The output Q of this first register is the data input of a second register 98, which is clocked by a STROBE* signal. The STROBE signal from which STROBE* is inverted is the request from the receiver for additional data. The output Q of the second register 98 is fed to the selector switch S of a first selector 100. First selector 100 passes through the STROBE* signal when S=1. When S=0, the inverse output of a third register 102 is passed through, the data input of which is tied high, and the inverse clear input of which is the STROBE signal. The third register 102 is clocked by the register clock signal, delayed by a first delay apparatus 104. The first delay apparatus 104 imposes a delay D1, to assure that the pipeline register has stabilized when input signals are fed to it. If the third register 102 is sufficiently slow, the first delay apparatus 104 may be omitted. The output of the first selector 100 is the READY* signal to be applied to the FIFO.

The output Q of the first register 96 is fed to the selecting switch S of a second selector 106. Second selector 106, like first selector 100, passes through the STROBE* signal when S=1. When S=0, the second selector 106 passes through the output of an AND gate 108, the inputs to which are the STROBE signal and the NOT-EMPTY signal.

The output of the second selector 106 is fed (see FIG. 8) to the clock input of a fourth register 110 which, like third register 102, has its data input D tied high. The output Q of the fourth register 110 is passed through a first inverter 112, the output of which is passed through a second delay apparatus 114. The second delay apparatus 114 delays the signal for a period D3 so as to give the FIFO time to read its data out to the pipeline register. The output of the second delay apparatus 114 is fed back to the inverse clear input of the fourth register 110. It is also passed through a second inverter 116, the output of which is the register clock signal REG-CLOCK.

The output of the first inverter 112 is the FIFO-READY* signal. This is applied to the READ* input of the FIFO 118, thereby allowing input data to be applied to a data-in gate DI. On a first-in-first-out basis, data output is supplied from the data-out gate of the FIFO 118 and is applied to the data input of the pipeline register 120. The pipeline register 120 is clocked by the register clock signal REG-CLOCK, which is the output of the second inverter 116. The data output of the pipeline register is then passed on to the receiving apparatus. The FIFO 118 also produces a NOT-EMPTY signal to be applied to the first register 96 and the AND gate 108 of FIG. 7.

FIG. 9 is a timing diagram of case 1, in which the data pipeline is empty. At 122, the STROBE signal goes high, indicating the start of the transfer request. At 124, the NOT-EMPTY signal goes high, indicating that valid data is available in the FIFO 118. At 126, the FIFO-READ* signal is initiated. At 128, a REG-CLOCK signal is generated, after a delay of D3, to move data from the FIFO 118 to the pipeline register 120. At 130, a READY* signal is generated after a D1 delay. At 132, the STROBE signal goes low, indicating the end of the data transfer period. At 134, the READY* signal is cleared. The apparatus is now ready to go on to case 2.

Figure 10:
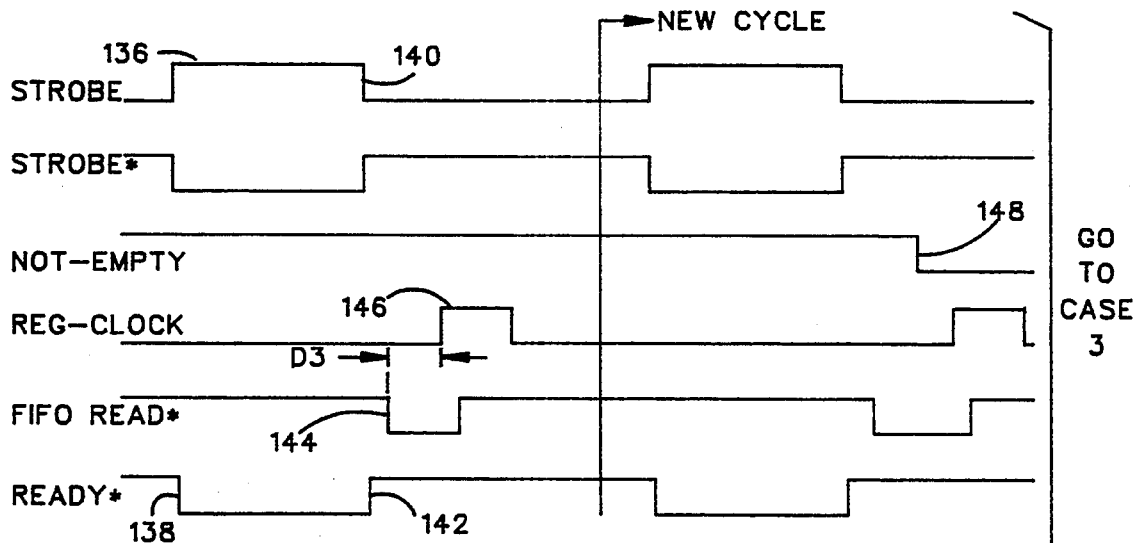
FIG. 10 is a timing diagram showing the operation of case 2.

FIG. 10 is a timing diagram covering case 2, in which the data pipeline is full. In this case, STROBE goes high at 136, indicating the start of the transfer cycle. The READY* signal is generated immediately, at 138, rather than after many delays as in FIG. 9, step 130. The STROBE signal goes low at 140, indicating the end of the data transfer cycle, and, at 142, the READY* signal is cleared. At 144, the FIFO-READ* is initiated and, after a delay of length D3, a REG-CLOCK signal is generated at 146 to move data from the FIFO 118 to the pipeline register 120. At the end of the pulse initiated at 146, the old cycle ends and a new cycle begins. As shown in FIG. 10, the NOT-EMPTY signal remained high during the entire first cycle. If it goes low during a second cycle, as shown at 148, then the apparatus must proceed to case 3. Otherwise, it stays in case 2, and the first cycle shown in FIG. 10 is repeated as many times as necessary.

FIG. 11 is a timing diagram for case 3, in which the data pipeline goes empty. It shown two cycles, but does not require a decision as to which case to go onto next, since case 1 must always follow case 3. At 150, the STROBE signal goes low, indicating the end of a data transfer cycle. The READY* signal is cleared at 152, and the FIFO-READ* signal is initiated at 154. At 156, the NOT-EMPTY signal goes low, indicating that there is no valid data in the FIFO 118. Therefore, after a D3 delay, a clock register signal REG-CLOCK is generated at 158 to move data from the FIFO 118 to the pipeline register 120, even though this data will be invalid data. This ends the first cycle. The second cycle begins at 160, when STROBE goes high. The READY signal is activated at 162, even though there is no readout from the FIFO 118. This is the pipeline emptying action. The data transfer cycle is completed at 164 when STROBE goes low.

INDUSTRIAL APPLICABILITY

The present invention is capable of exploitation in industry, and can be used, whenever it is desired to fill and empty a pipeline between a data sender and a data receiver, without the receiver having to determine, on its own, whether the pipeline is full or empty. The present invention is capable of being made from components which, taken separate and apart from one another, may be entirely conventional, or it may be made from their nonconventional counterparts.

While a particular embodiment of the present invention has been described in some detail, the true spirit and scope of the present invention are not limited to this embodiment, but are limited only by the following claims.

What is claimed is:
1. A method for self filling and emptying a data pipeline register between a first-in-first-out register (FIFO) and a receiver, the method comprising the steps of:
 (1A) waiting for a data transfer request from the receiver and for a FIFO NOT-EMPTY signal from the FIFO;
 (1B) generating a FIFO-READ* signal upon receipt of the data transfer request from the receiver and the FIFO NOT-EMPTY signal from the FIFO;
 (1C) delaying for a delay period D3 until data is read out of the FIFO;
 (1D) moving data from the FIFO to the above-recited data pipeline register;
 (1E) clearing the FIFO-READ* signal;
 (1F) testing the FIFO NOT-EMPTY signal
 (1G) proceeding to step (2A) if the FIFO is empty, or to step (3A) if the FIFO is not empty;
 (2A) generating a READY* signal;
 (2B) waiting for a data transfer cycle to complete;
 (2C) clearing the READY* signal upon completion of the data transfer cycle;
 (2D) returning to step (1A);
 (3A) generating a READY* signal;
 (3B) waiting for a data transfer cycle to complete;
 (3C) clearing the READY* signal upon completion of the data transfer cycle;
 (4A) generating a FIFO-READ* signal;
 (4B) delaying for a delay period D3 until data is read out of the FIFO;
 (4C) moving data from the FIFO to the pipeline register;
 (4D) clearing the FIFO-READ* signal;
 (4E) testing the FIFO NOT-EMPTY signal;
 (4F) proceeding to step (6A) if the FIFO is empty, or to step (5A) if the FIFO is not empty;
 (5A) waiting for a data transfer request from the receiver;
 (5B) generating a READY* signal upon receipt of the data transfer request from the receiver;
 (5C) waiting for a data transfer cycle to complete;
 (5D) clearing the READY* signal upon completion of the data transfer cycle;
 (5E) returning to step (4A);
 (6A) waiting for a data transfer request from the receiver;

(6B) generating a READY* signal upon receipt of the data transfer request from the receiver;
(6C) waiting for a data transfer cycle to complete;
(6D) clearing the READY* signal upon completion of the data transfer cycle; and
(6E) returning to step (1A).

2. The method of claim 1, wherein each performance of the steps of moving data from the FIFO to the pipeline register and clearing the FIFO-READ* signal is performed by generating a REG-CLOCK signal.

3. The method of claim 1, further comprising, before each READY* signal generation step, the step of delaying for a delay period D1 to assure that the pipeline register has stabilized when input signals are fed to it.

4. An apparatus for self filling and emptying a data pipeline register between a first-in-first-out register (FIFO) and a receiver, the apparatus comprising:
(1A) means for waiting for a data transfer request from the receiver and for a FIFO NOT-EMPTY signal from the FIFO;
(1B) means for generating a FIFO-READ* signal upon receipt of the data transfer request from the receiver and the FIFO NOT-EMPTY signal from the FIFO;
(1C) means for delaying for a delay period D3 until data is read out of the FIFO;
(1D) means for moving data from the FIFO to the pipeline register;
(1E) means for clearing the FIFO-READ* signal;
(1F) means for testing the FIFO NOT-EMPTY signal
(1G) means for proceeding to the actuation of the apparatus described in paragraph (2A) if the FIFO is empty, or to the actuation of the apparatus described in paragraph (3A) if the FIFO is not empty;
(2A) means for generating a READY* signal;
(2B) means for waiting for a data transfer cycle to complete;
(2C) means for clearing the READY* signal upon completion of the data transfer cycle;
(2D) means for returning to the actuation of the apparatus described in paragraph (1A);
(3A) means for generating a READY* signal;
(3B) means for waiting for a data transfer cycle to complete;
(3C) means for clearing the READY* signal upon completion of the data transfer cycle;
(4A) means for generating a FIFO-READ* signal;
(4B) means for delaying for a delay period D3 until data is read out of the FIFO;
(4C) means for moving data from the FIFO to the pipeline register;
(4D) means for clearing the FIFO-READ* signal;
(4E) means for testing the FIFO NOT-EMPTY signal;
(4F) means for proceeding to the actuation of the apparatus described in paragraph (6A) if the FIFO is empty, or to the actuation of the apparatus described in paragraph (5A) if the FIFO is not empty;
(5A) means for waiting for a data transfer request from the receiver;
(5B) means for generating a READY* signal upon receipt of the data transfer request from the receiver;
(5C) means for waiting for a data transfer cycle to complete;
(5D) means for clearing the READY* signal upon completion of the data transfer cycle;
(5E) means for returning to the actuation of the apparatus described in paragraph (4A);
(6A) means for waiting for a data transfer request from the receiver;
(6B) means for generating a READY* signal upon receipt of the data transfer request from the receiver;
(6C) means for waiting for a data transfer cycle to complete;
(6D) means for clearing the READY* signal upon completion of the data transfer cycle; and
(6E) means for returning to the actuation of the apparatus described in paragraph (1A).

5. The apparatus of claim 4, wherein the means for moving data from the FIFO to the pipeline register and for clearing the FIFO-READ* signal comprises means for generating a REG-CLOCK signal.

6. The apparatus of claim 4, further comprising means for delaying for a delay period D1 to assure that the pipeline register has stabilized when input signals are fed to it, said delay means being situated and constructed to be actuated before the actuation of each means for generating a READY* signal.

7. An apparatus for self filling and emptying a data pipeline register between a first-in-first-out register (FIFO) and a receiver, the apparatus comprising:
(a) a first register receiving a NOT-EMPTY signal from the FIFO at a data input, and being clocked by a register clock signal REG-CLOCK, generated as described below;
(b) a second register, a data input of which is an output Q of said first register, said second register being clocked by a STROBE* signal, the STROBE signal from which STROBE* is inverted being the request from the receiver for additional data;
(c) a first selector having a selector switch S which receives an output Q of the second register, the first selector passing through the STROBE* signal when S=1 and passing through the inverse output of the below described third register when S=0, the first selector having a data input which is tied high, and having an inverse clear input which is the STROBE signal, an output of the first selector being the READY* signal to be applied to the FIFO;
(d) a third register, which is clocked by the register clock signal;
(e) a second selector having a selecting switch S which receives the output Q of the first register, the second selector passing through the STROBE* signal when S=1 and passing through the output of the below described AND gate when S=0;
(f) an AND gate, the inputs to which are the STROBE signal and the NOT-EMPTY signal;
(g) a fourth register having a clock input which receives the output of the second selector, the fourth register having a data input D tied high, and having an output Q which is passed through a first inverter, the output of which is passed through the below described second delay apparatus; and
(h) a second delay apparatus delaying the signal for a period D3 so as to give the FIFO time to read its data out to the pipeline register, the output of the second delay apparatus being fed back to an inverse clear input of the fourth register, and also being passed through a second inverter, the output of which is the register clock signal REG-CLOCK;

the output of the first inverter being the FIFO-READY* signal which is applied to the READ* input of the FIFO, thereby allowing input data to be applied to a data-in gate DI; and, on a first-in-first-out basis, data output being supplied from the data-out gate of the FIFO and being applied to the data input of the pipeline register; the pipeline register being clocked by the register clock signal REG-CLOCK, said REG-CLOCK signal being the output of the second inverter; the data output of the pipeline register then being passed on to the receiver; the FIFO also producing a NOT-EMPTY signal to be applied to the first register and to the AND gate.

8. The apparatus of claim 7, further comprising a first delay apparatus imposing a delay D1 between the register clock signal and the third register, to assure that the pipeline register has stabilized when input signals are fed to it.

* * * * *